United States Patent [19]

Becker-Ross et al.

[11] Patent Number: 4,856,898

[45] Date of Patent: Aug. 15, 1989

[54] ADJUSTABLE ECHELLE SPECTROMETER ARRANGEMENT AND METHOD FOR ITS ADJUSTMENT

[75] Inventors: Helmut Becker-Ross; Stefan Florek, both of Berlin; Felix Kerstan; Guenther Moebius, both of Jena; Horst Sanders, Teltow, all of German Democratic Rep.

[73] Assignee: Jenoptik Jena GmbH, Jena, German Democratic Rep.

[21] Appl. No.: 166,870

[22] Filed: Mar. 11, 1988

[30] Foreign Application Priority Data

May 4, 1987 [DD] German Democratic Rep. .................................. 3024066

[51] Int. Cl.$^4$ .............................................. G01J 3/18
[52] U.S. Cl. .................................... 356/328; 356/332; 356/334
[58] Field of Search ............... 356/305, 328, 331, 332, 356/333, 334

[56] References Cited

U.S. PATENT DOCUMENTS 3,658,424  4/1972  Elliott ................................ 356/334
4,690,559  9/1987  Florek et al. .................... 356/332 X Primary Examiner—Vincent P. McGraw
Attorney, Agent, or Firm—Jordan and Hamburg

[57] ABSTRACT

An adjustable Echelle spectrometer arrangement which can be used in single- and multi-element analysis by the emission or absorption of optical radiation. To compensate all the manufacturing and setup errors, the only arrangements present are those to change the height of the entry slit arrangement above the base plate and to rotate the dispersion prism about a first axis, approximately parallel to its roof edge, and about a second axis, that is vertical thereto. This compensates for the effect of errors associated with component and setup parameters which results from greater tolerances, without impairing mechanical and thermal stability and imaging quality.

6 Claims, 2 Drawing Sheets

ADJUSTABLE ECHELLE SPECTROMETER ARRANGEMENT AND METHOD FOR ITS ADJUSTMENT

BACKGROUND OF THE INVENTION

The invention relates to optical spectroscopy and single- and multi-element analysis by the emission or absorption of optical radiation.

Compared to other spectrometers, Echelle spectrometers have the advantage of higher resolution with the same focal length or of a smaller and more compact structure with the same resolution. In Echelle spectrometers, a dispersion prism is generally used to separate the orders, so that a two-dimensional spectrum arises in the focal plane (DE-1909841). A wavelength is here associated with every position in the focal plane, and vice versa. The parameters of the components, such as the grid constant, the prism angle, and the wavelength-dependent index of refraction and the mutual distances and angles of the components, as well as the air pressure (altitude of the erection site above sea level) and the temperature, all enter as parameters in the functional relationship between position and wavelength. By purposefully changing the parameters, an Echelle monochromator can be tuned as regards wavelength. In that case, generally only one exit slit exists in the focal plane. According to DE-1909841, the dispersion prism is turned about its roof edge for this purpose, and the Echelle grid is turned about an axis that is approximately parallel to the groove as well as about an axis that stands thereon and that is perpendicular to the optic axis.

With a polychromator, light of different wavelengths (spectral lines) emerges through different exit slits which are arranged in the focal plane, where the components remain nearly stationary. The mutual position of the exit slits is suitably fixed by a mask. The emerging light is conducted by fiber-optic light guides onto the receivers (DD-WP 217626). The theoretical values for the positions of the spectral lines, which then can be implemented in the exit slit mask, are derived from the theoretical values for all the parameters which simultaneously secure the highest imaging quality (DD-WP 226962). For this reason, when Echelle spectrometers are mass produced, the position of the spectral lines must be reproduced very precisely. Because the positions of the spectral lines depend on very many parameters, very close tolerances must therefore be required for each parameter. This demands great expenditure in the fabrication of the components and in the adjustment of their mutual position.

For reasons of mechanical stability, the large number of setup parameters does not permit making provision for adjusting all these setup parameters. The components must be adjusted once furing setup, and then must be fastened so that they can no longer change their position as a result of transport or the like. If the indispensable checking of the line positions reveals too large a deviation of the spectral lines from the exit slits, the totality of setup and component parameters must be examined and must be corrected if necessary. Component parameters can be corrected in this arrangement only by replacing the component.

For the above-mentioned reasons, mass production of Echelle spectrometers with an exit slit mask is associated with very great expense. Furthermore, when the spectrometer is repaired (when replacing components), the necessary adjustment of the component must be repeated with expensive adjustment means, until the positions of the spectral lines agree with the exit slits. Furthermore, the use of the spectrometer is limited to a narrow temperature and pressure range.

SUMMARY OF THE INVENTION

The object of the invention is to reduce the expense in the fabrication, adjustment, and repair of Echelle spectrometers, as well as to expand the temperature and pressure range within which it can be used.

The object of the invention is also to compensate the effect of errors in all the component parameters and the mutual arrangement of components, which occurred due to greater tolerances, without noticeably impairing mechanical and thermal stability and the imaging quality. This aim is achieved according to the invention by the provision of an adjustable Echelle spectrometer arrangement fastened on a base plate and which, along the optical path, has sequentially an entry slit arrangement, a collimator mirror, a dispersion prism, an Echelle grid, a camera mirror, and a beam exit in the focal plane, wherein, to compensate all the fabrication and setup errors, there is provided solely means for changing the height of the entry slit arrangement above the base plate and for rotating the dispersion prism about a first axis that is approximately parallel to its roof edge as well as about a second axis that is perpendicular thereto, and wherein the Echelle grids and the collimator mirror are rigidly connected to the base plate.

Advantageously the second axis, about which the dispersion prism is rotatable, lies within the angle that is enclosed by the two legs of the triangular base area of the dispersion prism.

A cylindrical cathode lamp, is imaged on the entry slit arrangement, is advantageously provided as an adjustment light source. Means to measure the spectral lines are placed after the exit slit mask at least at three spectral line positions.

To align the spectrum with the beam exit that is formed as an exit slit mask, adjustment means are provided which permit the exit slit mask and the spectrum to be mutually rotated and displaced. The entire spectrum is displaced in the focal plane by rotating the camera mirror about two axes that are perpendicular to one another and to the optic axis. The spectrum is rotated by turning the exit slit mask about its plane normal.

The invention furthermore provides a method for adjusting an Echelle spectrometer arrangement in which the radiation is decomposed by wavelengths into order lines and is imaged in a focal plane wherein an out-of-tolerance spacing of two spectral lines on a long-wave order line is compensated by changing the height of the entry slit arrangement above the base plate, and wherein an out-of-tolerance spacing of a third short-wave spectral line with respect to the first two lines is compensated by rotating the dispersion prism about its roof edge, and wherein an out-of-tolerance angle between the connecting line of the two long-wave lines and one of the connecting lines to the third short-wave line is compensated by rotating the dispersion prism about an axis that is approximately perpendicular to its roof edge. If one disregards the interaction among the individual adjustment steps, and if larger deviations occur, it may be necessary to repeat the adjustment once again. If one does take into account their interaction, it is possible to determine the required adjustment from the actual coordinates of the three lines, and to make the adjustment in one step. By taking into account the actual coordinates of more than three lines, even non-linear spectral errors can be compensated when certain tolerances are prescribed. The smallest interactions result when the second axis about which the dispersion prism is rotatable is situated in the plane perpendicular to the roof edge, in such a fashion that the rotation of the prism entails no change of direction for a suitable chosen wavelength (in the middle of a long-wave order line). Consequently this axis should lie within the angle that is included by the two legs of the triangular base surface of the dispersion prism.

The mutual position of the spectral lines is achieved for a particular combination of component and setup parameters under specific climatic conditions. This mutual position can be achieved not only by adhering precisely to these parameters, but also with a large number of parameter combinations. However, three auxiliary conditions must be imposed here, i.e. the parameters must fulfill three equations - or else three parameters must be fixed as a function of all other freely selectable parameters. If these conditions are not adhered to, deviations will occur on a linear approximation in the principal dispersion and the transverse dispersion, and a parallelogram distortion will also occur. The three auxiliary conditions can be fulfilled by changing three suitable parameters in specific fashion, where each individual one causes measurable changes in the spectrum (linear distortions). However, the parameters are changed so slightly with respect to the theoretical values, that as yet no measurable impairment of imaging quality results, and the non-linear residual errors lie within the tolerance range. The adjustment points are chosen so that the desired spectral correction requires a maximum change of angle at the component, so that mechanical and thermal stability is affected only insignificantly.

The Echelle spectrometer arrangement which is adjusted according to the inventive method can satisfacorily use components that have significantly larger tolerances, and that are considerably cheaper. The setup tolerances for the individual elements can be enlarged, so that the requirements for the precision of the setup adjustment can be considerably reduced and mounting time can be saved. This substantially reduces the manufacturing expense. In the case of repair, after a component has been replaced, deviations in the spectrum may occur. These are likewise eliminated according to the inventive method. For this purpose, no additional means are required. The temperature and pressure range within which the equipment may be used can be substantially expanded sine (climatically based) spectral errors can be relatively simply corrected at the erection site. Even with conventional spectrometers, the position of the spectral lines must be checked. Now this check is also used to determine the displacement at the three adjustment points as well as to align the slit mask in the focal plane. The displacement at the adjusting elements compensates possible errors in the spectrum without eliminating their causes, but also without measurably impairing the imaging quality.

If the arrangement of the invention is used as a monochromator (e.g. according to the DE-3516183 Al), this entails the advantage that only one reference wavelength is needed to calibrate the wavelength.

BRIEF DESCRIPTION OF THE DRAWINGS

The invention will be explained in more detail with reference to the accompanying drawings, wherein.

DETAILED DISCLOSURE OF THE INVENTION

Figure 1:
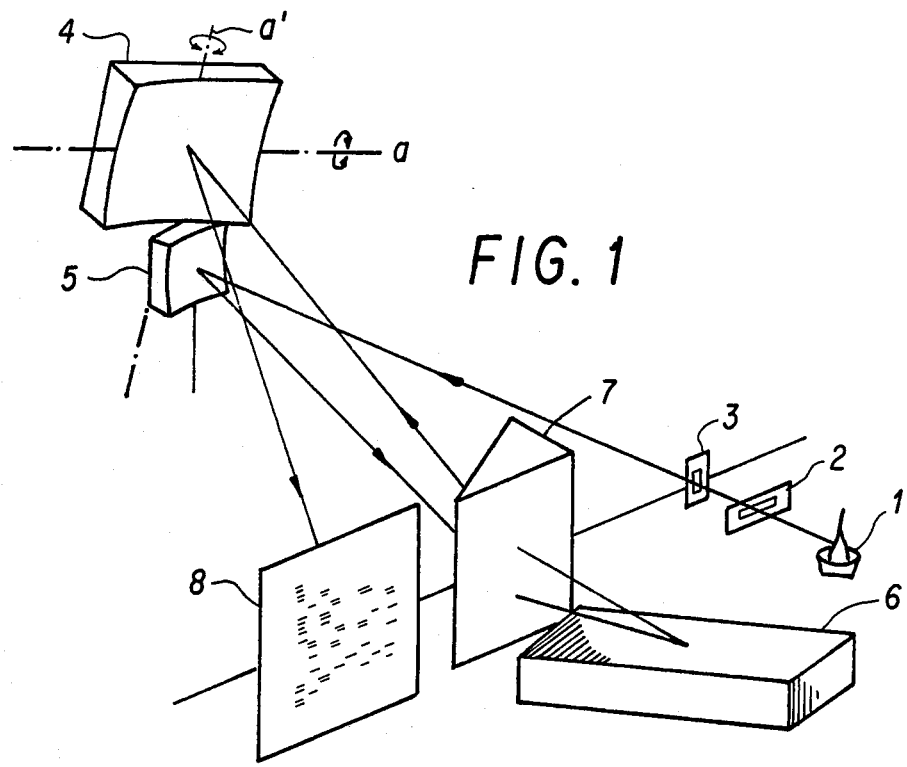
FIG. 1 shows the optical arrangement of the Echelle spectrometer in a perspective representation.

FIG. 1 shows a light source 1, which is a cylindrical cathode lamp used during the adjustment process. Along the optical path, the source is followed by a light entry opening which consists of two mutually perpendicular slits 2,3. A camera mirror 4 and a collimator mirror 5, both designed as spherical concave mirrors, adjoin one another closely, and their vertices are equidistant from the center point of an Echelle grid 6. The camera mirror 5 is mounted rotatably about two axes a,a' which extend perpendicular to the optic axis. They can be moved in defined fashion by step motors which are driven under computer control, and by a spindle via lever arms. To separate the optical orders, a dispersion prism 7 precedes the Echelle grid in the double beam passage. An exit slit mask 8 is disposed in the focal plane of the optical system. Not shown are means to detect the light radiation emerging from the exit slit mask 8.

Figure 2:
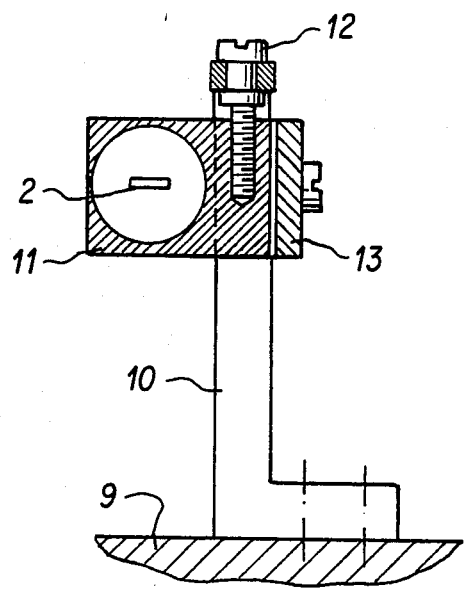
FIG. 2 shows the displacement of the slit height at the entry slit arrangement, partially in section.

The two entry slits 2 and 3 are illuminated by the light source 1. The light passing through the entry slit arrangement is made parallel by the collimator mirror 5 and passes through the dispersion prism 7 which causes a different deflection of the different wavelengths. The Echelle grid 6 creates a wavelength-dependent decomposition in a direction perpendicular to the first deflection. The camera mirror focuses the light of different wavelengths extending in different directions onto the exit slit that is provided in the exit slit mask 8. The means for adjusting the slit heights consist of a fastening foot 10, (FIG. 2) that is rigidly connected with the base plate 9. A support 11 for the entry slit 2 is guided in said fastening foot. The height of the entry slit arrangement above the base plate is changed by turning a screw 12. After the adjustment has been made, the support 11 is clamped with a vise 13.

Figures 3, 4:
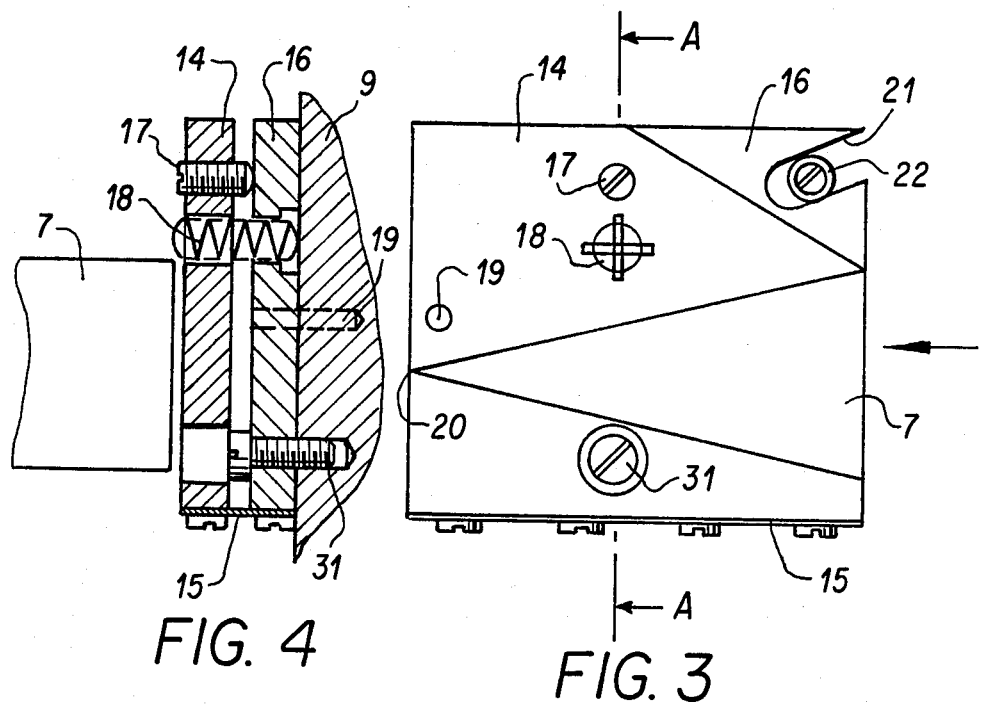
FIG. 3 shows a top view of the means to rotate the dispersion prism.
FIG. 4 shows the Section A—A through FIG. 3.

The dispersion prism 7 is fastened on a support plate 14 (FIGS. 3 and 4, this plate being connected to an intermediate plate 16 through a spring hinge 15. A screw 17 in the plate 18 is urged against the intermediate plate 16 by a tension spring 18. The intermediate plate is rotatable about a pin 19 that is fastened in the base plate 9. This pin 19 forms a rotation axis that is approximately parallel to the roof edge 20 of the prism 7. On the other hand, the spring hinge 15 defines a rotation axis perpendicular to the rood edge. An eccentric screw 22 extending in a guide 21 of the intermediate plate 16 is screwed in the base plate 9. By adjusting the screw 17, the prism 7 is rotated through the spring hinge 15 about an axis that is perpendicular to the roof edge 20. The eccentric screw 22 rotates the intermediate plate 16 about the pin 19, and thus the prism 7 about the axis that is approximately parallel to the roof edge. After an adjustment has been made, the intermediate plate 16 is fixed on the base plate 9 by a screw 31.

Figure 5:
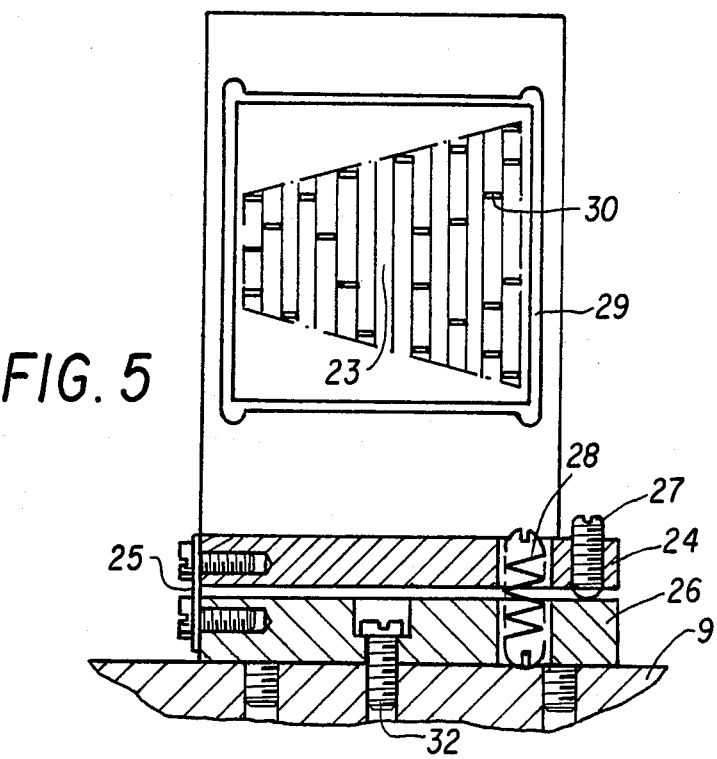
FIG. 5 shows the adjustment means to rotate the exit slit mask.

The exit slit mask 8 is fastened on a holding frame, and the latter is fastened on the base plate 9 via a support plate 24 (FIG. 5), a spring hinge 25, and an intermediate 26. The exit slit mask 8 is rotated about its plane normal plane 23 by a screw 27, which is urged by a tension spring 28 against the intermediate plate 26. A so-called fiber block 29 connected to the exit slit mask 8. The fiber block 29 contains a number of fiber-optical light guides (not shown), which correspond to the exit slits 30 that are present in the exit slit mask 8. These fiber-optical light guides are used to conduct the light of the spectral lines to a detection means (not shown).

We claim:

1. In an adjustable Echelle spectrometer arrangement which is fastened on a base plate and which is comprised, sequentially, along the optical path of an entry slit arrangement, a collimator mirror, a dispersion prism, an Echelle grid, a camera mirror, and a beam exit in the focal plane, the improvement comprising means for compensating for all errors in the fabrication and setup of said arrangement, said compensating means comprising solely means for changing the height of the entry slit arrangement above the base plate and for rotating the dispersion prism about a first axis that is approximately parallel to the roof edge of the dispersion prism as well as about a second axis that is perpendicular thereto, the Echelle grid and the collimator mirror being rigidly connected to the base plate.

2. An adjustable Echelle spectrometer arrangement according to claim 1, wherein the dispersion prism has a triangular base surface, and the second axis, about which the dispersion prism is rotatable, lies within the angle enclosed by the two legs of the triangular base surface of the dispersion prism.

3. An arrangement according to claim 1, wherein the camera mirror is rotatable about two axes that are perpendicular to one another and perpendicular to the optical path.

4. An arrangement according to claim 1, wherein the beam exit comprises an exit slit mask having several exit slits with fixed mutual positions, the exit slit mask being rotatable about an axis normal to its plane.

5. An arrangement according to claim 1, comprising an adjustment light source, said source comprising a cylindrical cathode lamp imaged onto the entry slit arrangement, and further comprising means following the exit slit mask for measuring the spectral lines at least at three spectral line positions.

6. A method for adjusting an Echelle spectrometer arrangement in which the radiation is decomposed by wavelengths into order lines and is imaged in a focal plane, said method comprising compensating for an out-of-tolerance spacing of two spectral lines on a long-wave order line by changing the height of the entry slit arrangement above the base plate, and compensating for an out-of-tolerance spacing of a third short-wave spectal line with respect to the first two lines by rotating the dispersion prism about its roof edge, and compensating for an out-of-tolerance angle between the connecting line of the two long-wave lines and one of the connecting lines to the third short-wave line by rotating the dispersion prism about an axis that is approximately perpendicular to its roof edge.

* * * * *